(12) United States Patent
Mazumder

(10) Patent No.: US 6,580,959 B1
(45) Date of Patent: Jun. 17, 2003

(54) SYSTEM AND METHOD FOR REMOTE DIRECT MATERIAL DEPOSITION

(75) Inventor: Jyoti Mazumder, Ann Arbor, MI (US)

(73) Assignee: Precision Optical Manufacturing (POM), Plymouth, MI (US)

( * ) Notice: Subject to any disclaimer, the term of this patent is extended or adjusted under 35 U.S.C. 154(b) by 0 days.

(21) Appl. No.: 09/575,857

(22) Filed: May 19, 2000

Related U.S. Application Data

(63) Continuation-in-part of application No. 09/522,671, filed on Mar. 10, 2000.
(60) Provisional application No. 60/135,228, filed on May 21, 1999, and provisional application No. 60/123,890, filed on Mar. 11, 1999.

(51) Int. Cl.[7] .............................................. G06F 19/00
(52) U.S. Cl. ........................ 700/121; 700/166; 700/112
(58) Field of Search ................................ 700/121, 166, 700/182, 112, 174, 169, 120, 119; 703/3; 706/46

(56) References Cited

U.S. PATENT DOCUMENTS

| | | | |
|---|---|---|---|
| 5,262,954 A | * 11/1993 | Fujino et al. ................ 700/112 |
| 5,291,416 A | * 3/1994 | Hutchins ..................... 700/174 |
| 5,772,861 A | * 6/1998 | Meredith et al. ............ 118/665 |
| 5,790,977 A | 8/1998 | Ezekiel ....................... 702/122 |
| 5,877,961 A | * 3/1999 | Moore ......................... 345/835 |
| 6,021,404 A | 2/2000 | Moukheibir .................. 706/46 |
| 6,047,259 A | 4/2000 | Campbell et al. .............. 703/3 |
| 6,055,487 A | 4/2000 | Margery et al. .............. 702/84 |

* cited by examiner

Primary Examiner—Leo Picard
Assistant Examiner—Kidest Bahta
(74) Attorney, Agent, or Firm—Gifford, Krass, Groh, Sprinkle, Anderson & Citkowski, PC

(57) ABSTRACT

A system and method for remotely controlling the fabrication of a product at a local manufacturing site. The product is fabricated by depositing successive material layers through a local laser-aided, feedback-controlled, direct material deposition system. The system is equipped with strain gages, optical sensors and acoustic sensors generating signals which are processed in a local computer to determine the temperature, strain and residual stress of the product during fabrication. A feedback controller interfaces with the local computer and with a numerical controller and operates to control the material deposition process. The local numerical controller receives a file of a digitized description of the product from the remote computer, preferably via an Internet connection. The local computer sends temperature, strain and stress data to the remote computer, enabling a designer interfacing with the remote computer to monitor, control and modify the fabrication of the product in real time on line. The fabrication process is recorded by video or television camera and the shown in real-time on a screen display connected to the remote computer.

21 Claims, 3 Drawing Sheets

SYSTEM AND METHOD FOR REMOTE DIRECT MATERIAL DEPOSITION

REFERENCE TO RELATED APPLICATIONS

This application claims priority of U.S. Provisional Patent Application Ser. No. 60/135,228, filed May 21, 1999, which is a continuation-in-part of U.S. Patent Application Ser. No. 09/522,671, filed Mar. 10, 2000, which claims priority of U.S. provisional patent application Ser. No. 60/123,890, filed Mar. 11, 1999. The entire contents of these and the following U.S. Patent Applications are incorporated herein by reference: Ser. No. 09/107,912, filed Apr. 10, 1997; and Ser. No. 09/526,631, filed Mar. 16, 2000.

FIELD OF THE INVENTION

In general, this invention relates to laser-aided direct material deposition processes and, more particularly, to a system and method of monitoring, controlling and modifying such processes, preferably in real time, from a remote location.

BACKGROUND OF THE INVENTION

Advances in modern telecommunication methods, including the Internet, as well as advances in data acquisition and manipulation, allow the transfer of large volumes of data between distant sites in a relatively short time. The use of web browsers enable users to view not only text, but also video, graphics and audio files.

Large data files may be compressed before their transfer by a variety of methods to speed transmission time. Connections between sites may be effected by high-speed links in asynchronous transfer mode (ATM) or using Ethernet and Fast-Ethernet in a Local Access Network (LAN) or Wide Access Network (WAN) environment.

Interactive image and data transmission is currently under development for various applications including medical examination, diagnosis and treatment of disease, as described in U.S. Pat. No. 6,021,404 (Universal computer assisted diagnosis), U.S. Pat. No. 6,055,487 (Interactive remote sample analysis system) and U.S. Pat. No. 6,047,259 (Interactive method and system for managing physical exams, diagnosis and treatment protocols in health care practice).

Another remote control application is related to remote access and exchange of data between a remote host and an instrument, such as the vector modulation analyzer (VMA) with resident control and data acquisition software, as described in U.S. Pat. No. 5,790,977.

The need remains, however, for a system and method enabling a design team at a remote site to monitor, control and modify the fabrication process of a product at a local manufacturing site. Such tele-control would be particularly advantageous when the manufacturing process involves specialized and delicately calibrated or expensive equipment, which is either too costly to duplicate at many plants or simply not available at the chosen or required site of production.

SUMMARY OF THE INVENTION

This invention utilizes advances in telecommunication and fast data transfer to control the fabrication of precisely dimensioned and intricately-detailed products through an automated, feedback-controlled, laser-aided direct material deposition (DMD) process, as described in co-owned and co-pending U.S. patent application Ser. No. 09/107,912, filed Apr. 10, 1997, and in U.S. patent application Ser. No. 09/522,671, filed Mar. 10, 2000.

The geometry of the product is provided by a computer-aided design system (CAD). The deposition tool path is generated by a computer-aided manufacturing system (CAM) for CNC machining having post-processing software for deposition, instead of software for removal, as in conventional CNC machining. The CAM software interfaces with a feedback controller. For in-situ control of the DMD manufacturing process, the computer holding the CAD/CAM software, the CNC and feedback controller and the laser equipment are all located at the local manufacturing site.

For remote control of the DMD process, a design team or an individual designer is located at the "remote" site and operates, through a user interface, their "remote" host computer. The remote computer stores the description of a product to be fabricated. The description is preferably processed by a commercial Computer-Aided Design and Computer-Aided Manufacturing (CAD/CAM) software package, also residing at the remote host computer. This software generates a CAM file from which the tool path file will be created.

Because the CAM file of the product description is large, it is first compressed by an efficient compression algorithm to enable its fast transmission, e.g. over the Internet, to the manufacturing site. The remote host computer is preferably equipped with two monitors, one with a graphical user interface and the other for image and video observation of the laser-aided direct material deposition process. The display preferably includes zoom and rotation capabilities to enable detailed and accurate view from various angles of the product undergoing fabrication.

When the designer perceives a defect, an abnormality or some other undesirable characteristic affecting the final quality of the product, or when it seems desirable to improve the design, the designer may pause or abort the fabrication process by sending a command to the controller of the DMD system at the "local", i.e. the manufacturing, site. The designer then edits the CAD file and transmits over the Internet the modified and post-processed CAM file, either in its entirety, or only a block of it containing the modification.

Optical sensors at the manufacturing site continuously monitor the composition, temperature, and dimensions of the product. Acoustic emission sensors and strain gages at the manufacturing site monitor residual stress development in the product. Some or all of the information from the sensors is sent via a communications system to the remote computer at the designer site to determine the need for corrective measures. The signals from the sensors are also sent to the local computer control system at the manufacturing site, where they are further processed to determine the independent parameters controlling the DMD process, e.g. the laser power, the beam diameter and the powder flow rate. The feedback controller uses this information to control the laser deposition process on command from the remote computer transmitted to the feedback controller through the local computer.

DETAILED DESCRIPTION OF THE INVENTION

Figure 1:
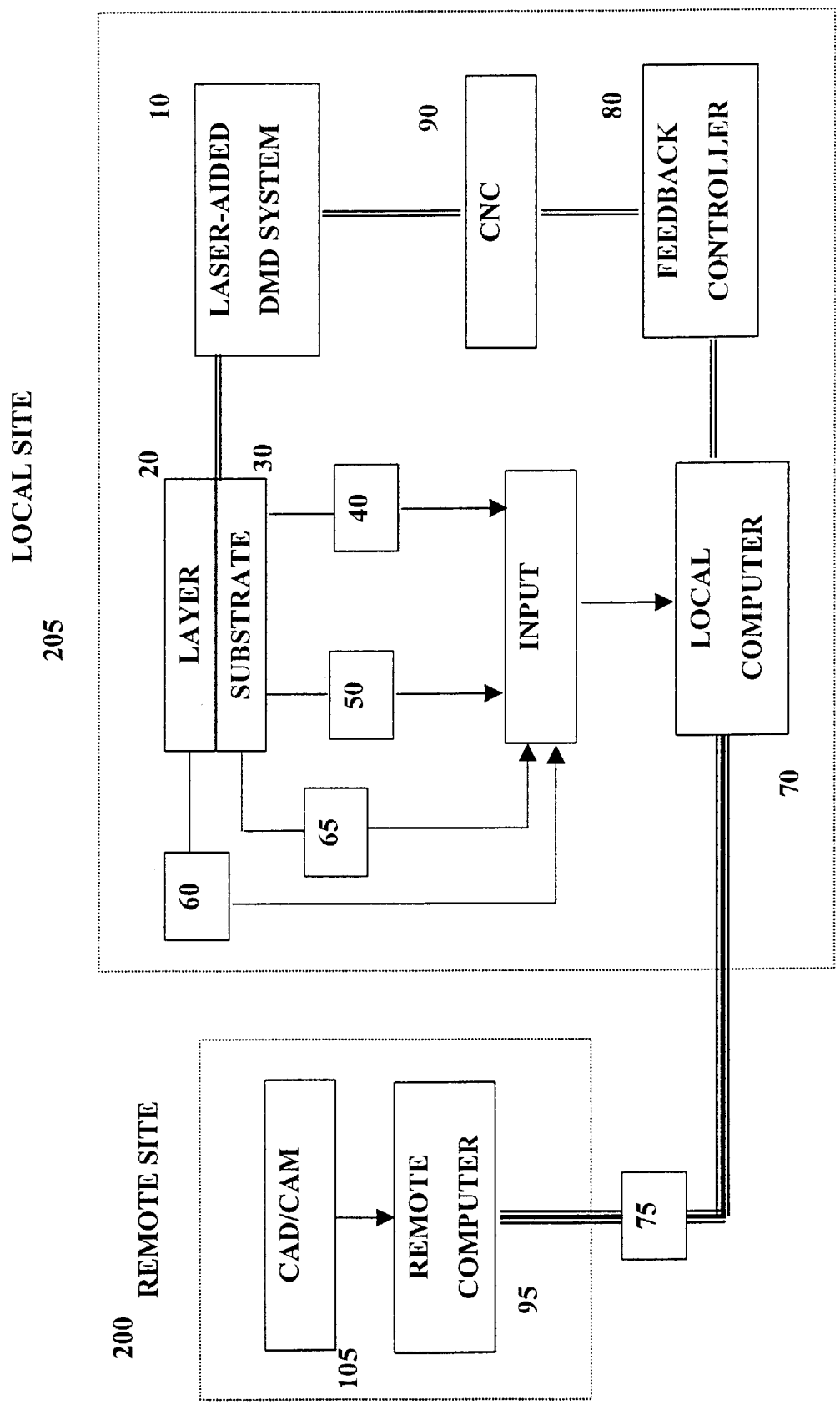
FIG. 1 is a block diagram depicting important subsystems according to the invention.

FIG. 1 is a block diagram which shows important subsystems according to the invention. A remote site 200 communicates with a local site 205 via a communications system 75, preferably including the Internet. The design group and design equipment and software are located at the remote site 200, while the manufacturing team and manufacturing equipment and software are located at the local site 205.

The local site includes a laser-aided, computer-controlled direct material deposition system 10, which is used to fabricate, repair or modify three-dimensional products by applying sequentially layers of material 20 on a substrate 30. The laser-aided direct material deposition system (DMD) 10 is equipped with a feedback controller 80 for monitoring and controlling the dimensions and overall geometry of the fabricated product. The feedback controller is connected with a computer numerical controller (CNC) 90 which guides the path of the laser beam incorporated in the DMD system 10. The details of the laser-aided, computer controlled direct material deposition system can be found in U.S. patent application Ser. No. 09/107,912 and are not all explicitly shown in FIG. 1.

The manufacturing system at the local site includes a local computer 70 interfacing with the feedback controller 80 and receiving input data from one or more sensors outputting information representative to fabrication progress. Such sensors may include strain gages 40, acoustic sensors 50, optical sensors 60 and video or television camera 65. One or more cameras may be spatially calibrated enabling dimensions to be remotely determined from the remote location. Contact and non-contact metrological instruments may also be used to perform accurate measurements to monitor the fabrication process. The local computer 70 communicates with a remote computer 95 via the communication system 75 and receives the necessary computer files defining the deposition tool path for the numerical controller (CNC) 90.

The remote site includes the remote computer 95, which receives input form a computer-aided design/computer-aided manufacturing (CAD/CAM) software program 105. The geometry of the product to be manufactured at the local site 205 is provided by a computer-aided design program (CAD) which is part of CAD/CAM 105 software. The CAM part of the CAD/CAM 105 software generates the deposition tool path. To accomplish this, the conventional CAM software is equipped with post-processing software for deposition, instead of post-processing software for removal, as is the case in conventional CNC machining. For in-situ DMD manufacturing, the CAM software interfaces directly with the feedback controller 80. For remote-control DMD manufacturing, the deposition tool-path files generated by the CAM software reside in the remote computer 95 and are sent via the communications system 75 to the local computer 75 which interfaces with the feedback controller 80.

Figure 2:
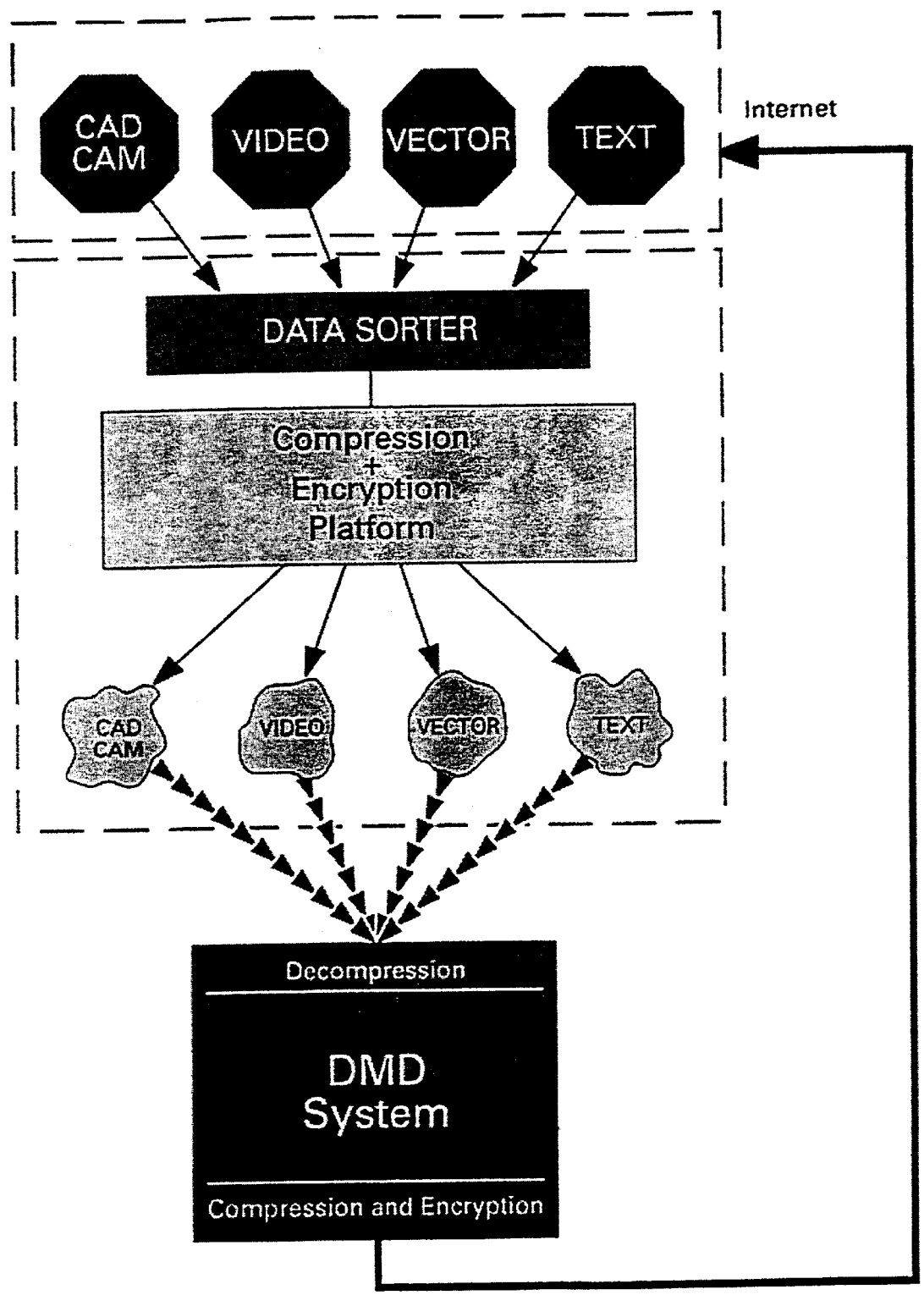
FIG. 2 is a block diagram of information flow according to the invention with an emphasis on data type, sorting, compression and encryption.

FIG. 2 is a drawing which emphasizes type of data and information flow. CAD/CAM data and sensor updates are preferably delivered to a data sorter and from there, to a compression/encryption platform. The information is decompressed and applied to the DMD system, with updated sensor outputs and other data being preferably compressed and encrypted prior to being sent back to the remote site.

The factors that affect the dimensions of material deposition typically include laser power, beam diameter, temporal and spatial distribution of the beam, interaction time, and powder flow rate. Adequate monitoring and control of laser power, in particular, has a critical effect on the ability to fabricate completed parts and products with complex geometric features and within control tolerances. Accordingly, the feedback controller 80 of the direct material deposition system typically cooperates directly with the numerical controller (CNC) 90, which, itself, controls all functions of the direct material deposition system, including laser power.

The laser source (not shown) of the DMD system is mounted above the substrate 30, and a layer of material 20 is deposited according to the description of the product, which is incorporated in the deposition tool path. The laser source has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle coaxially with the beam.

The numerical controller 90 preferably controls all operating components of the DMD system of FIG. 1, including the operating conditions of the laser, receiving direction from the remote computer 95 through the communications system 75 and the local computer 70 for building the part or product. The commands received depend on the design (CAD) files of the product, which have been translated to deposition tool path files for deposition by the remote computer 95 before they were sent to the local computer. The tool path files enable the numerical controller (CNC) 90 to prescribe a path for the laser nozzle across the substrate for material deposition.

The numerical controller 90 also receives feedback control signals from the feedback controller 80 to adjust laser power output, and further controls the relative position of the substrate and laser spray nozzle. All these functions are coordinated by the local computer 70, which sends feedback data to the remote computer 95 and receives instructions from the remote computer 95 to control the deposition process and, if necessary, to alter the entire laser source path or parts of it.

For real-time, on-line control of the deposition process from the remote site, it is important that fast communication connections are used. The tool path files, which are generated by the CAM program in the remote computer 95, are preferably transferred in seconds, and on line editing is preferably done in milliseconds. The tool path files are typically files of the coordinates of many points along the tool path and, for a realistic part or product, have size of the order of 100 MB. This is because CAM software models contours (curved lines) into short chords (straight-line segments), sometimes shorter than 0.0001 inch.

When a product demands precise contouring of intricate geometric features, many more and shorter chords are needed, and the tool path program becomes too long. Several commercial compression codes are available and can reduce the size of the files by compressing them before transmittal. In addition, some common sense rules and recent techniques have been developed to shorten the size of the tool path files, especially for blocks of dense data near tightly curved geometric features. Such rules include:

Eliminating non-essential characters, such as comments, especially since the design group at the remote computer will control the deposition process.

Using the "tenths" rather than the decimal format, so that 0.0003 is written as 3 in the language of the tool path code (G-code).

Not repeating numerical control commands (G-code commands) on each line, since those commands stay on until turned off.

Recent techniques for reducing tool path file size include circular interpolation and NURBS. Circular interpolation simply fits circular arcs of various radii to the coordinate-point data. A substantial program-size reduction is achieved, because an arc can represent a larger portion of a curve than a straight-line segment with comparable accuracy. Tool path files that have been converted to circular arc files are typically 60 to 90 percent smaller than the original point-to-point files, according to Tom Beard, "Machining in Circles", published in Modern Machine Shop, July 1996. A commercial software code NWDesigns MetaCut has been developed by Northwood Designs, Inc., (Antwerp, N.Y.).

Figure 3:
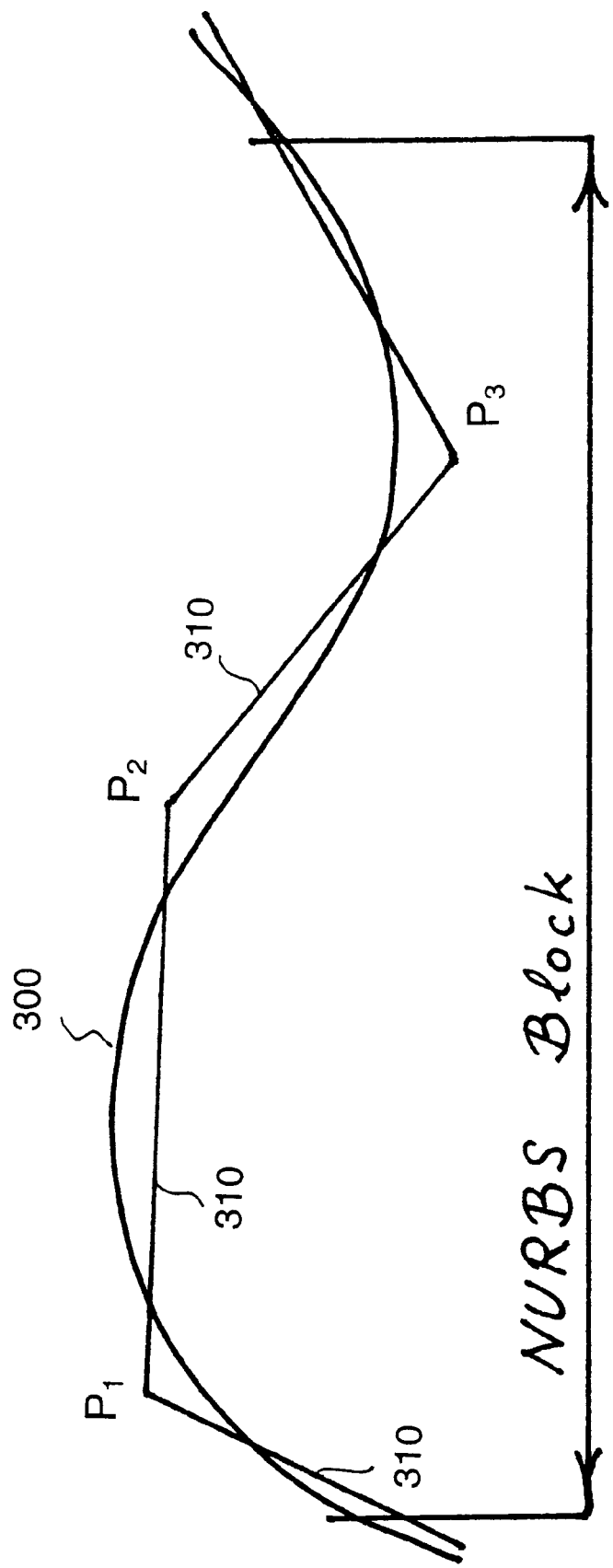
FIG. 3 is an illustration of a NURBS interpolation useful to the invention.

NURBS (Non-Uniform Rational B-Spline) is a type of curve interpolation that uses spline curves, which are much more versatile than circular arcs. Recent CAM software incorporates a NURBS spline command into the tool path file by a single G-code command "G6.2". The result is a single line of tool path programming instead of a dense block of file for a complex, curving tool path. Norwood Designs, Inc., and Delcam International (Windsor, Ontario) offer CAM systems that produce NC tool paths incorporating NURBS from CAD files. FIG. 3 shows the extent of a typical NURBS block replacing the linearized segments 310 of an original curved contour 300.

To control the quality of the product, strain changes in the deposited layers are monitored through several sensor systems during the deposition process. Returning to FIG. 1, a mechanical strain gage system 40 includes conventional high-temperature strain gages attached to the back surface of the substrate 30. The strain gages 40 measure strain in predetermined locations and directions, typically X, Y directions, along and across the deposition path. These gages are attached on the back of the substrate with high-temperature solder or other temperature-resistant means to avoid damage from laser heat or stray reflection from the laser beam.

Additional, non-purely-mechanical, sensors systems are incorporated, preferably acoustic sensors 60 and optical sensors 50. The acoustic sensors operate on the principle that during material deposition strains and other physical changes, such as phase transformation changes, or crack/defect initiation produce sound waves which can be picked up by the acoustic sensors 60. The acoustic sensors 60 are typically piezoelectric. Currently miniaturized acoustic sensors are used for micro electrical mechanical systems (MEMS). U.S. Pat. Nos. 4,783,821 and 4,816,125, for example, disclose a miniature diaphragm pressure transducer.

The acoustic sensors, whether miniaturized or not, are basically micro-microphones or microphones, respectively, which convert sound waves to electrical signals. The optical sensors 50 include a variety of devices, such as those operating on photovoltaic, fiber optic, and interferometric principles. Using an optical detector and an interference measuring technique, small strains can be measured with high sensitivity. The acoustic sensors and optical sensors must be calibrated against independent (mechanical) strain-gage measurements. The acoustic sensors, in particular, require careful calibration to distinguish strain from other sources of acoustic emission from the product, such as crack initiation, defect formation, and phase transformation, during the fabrication of the product fabrication through laser-aided material deposition.

The acoustic sensors 60, optical sensors 50 and strain gages 40, send their strain measurements during the deposition process to the local computer 70 in the form of electrical signals. A rough estimate of stresses may be obtained through linear stress strain relations and elementary beam theory, but a complete residual stress history requires the incorporation of finite element codes, such as those commercially available for linear and nonlinear systems. The local computer 70 is programmed to offer both of these options: a rough calculation for experimental purposes during product design and development, and a full-fledged finite element analysis for more accurate prediction during actual production.

The computer program compares the results of the stress-strain calculation with pre-determined failure criteria which incorporate a safety factor. The simplest criterion is to compare the maximum tensile stress with the yield stress and require the ratio not to exceed a given value. For ductile materials and multi-axial stresses, more sophisticated failure criteria may be incorporated in the stress analysis computer program, such as the von Mises or maximum strain energy criterion, or even crack initiation and propagation theories may be applied. Based on the results of the failure analysis, the local computer issues a warning/alarm signal for a human operator at the local site, or sends an electronic signal to the remote computer for online control, or sends appropriate commands to a feedback controller 80, which interfaces with the numerical controller 90.

The numerical controller initiates corrective action, such as termination of the deposition process, adjustment of the deposition rate or laser power, and changes in the cooling conditions. The data from the sensor systems 40, 50, 60 are processed by the local computer to produce real-time temperature, strain and stress data during the fabrication process. The sensor data are transmitted through the communications system 75 to the remote computer 95 for remote control of the process, or for modification of the product design, in its entirety or in part, and for replacement of the original CAM file with a new edited CAM file or CAM-file block to be transmitted back to the local computer 70.

In addition to the sensor systems 40, 50, 60, a video or TV camera 65 records the laser-aided DMD process and transmits the images to the local computer 70, which then sends the images together with the associated temperature, strain and stress data to the remote computer 95 to be displayed preferably on a TV screen or shown on the remote computer monitor as streaming video (display screens not shown in FIG. 1).

The temperature, strain and stress data, visual images or metrological information collected at the local manufacturing site 205 are all processed through the local computer 70, which communicates with the remote computer 95 and the numerical 70 and feedback 80 controllers. All the data-processing is done locally at the manufacturing site 205 and only processed information of actual temperature, strain and stress, as well as physical dimensions, composition and appearance of the product is transmitted to the remote computer 95. Modification of CAD and CAM files, as well as generation and compression of the tool path files is done at the remote site 200 using the remote computer 95.

In the preferred configuration, only the new or edited compressed tool path files are transmitted to the local computer 70. The reason for this is that, according to the invention, the control of the manufacturing process lies with the remote site 200 that houses the design team. If there is a need to transfer control to the local site 205, the CAD files are simply transmitted to the local computer 70, and a backup package, which is stored in the local computer and includes CAM software and post-processing software for generating tool path code, is used instead. This latter mode of operation is intermediate between in-situ and remote-control direct material deposition process.

I claim:

1. A remote control manufacturing system, comprising:
a remote computer system for generating and editing a design description of a product;
a local manufacturing system for fabricating the product in accordance with the design description using a laser-aided direct material deposition (DMD) process interfaced to a numerical controller, the DMD process being characterized in that the laser is used to create a melt pool into which powder or other feed material is delivered to create three-dimensional objects; and
a communications link facilitating the electronic transfer of design, manufacturing and control information between the remote computer system and the local manufacturing system, thereby enabling the remote computer to monitor, control and modify the fabrication process at the local manufacturing system.

2. The remote control manufacturing system of claim 1, wherein the manufacturing system interfaces with a feedback controller.

3. The remote control manufacturing system of claim 1, wherein the local manufacturing system includes one or more sensors to collect temperature, strain or stress data for transmission to the remote computer system.

4. The remote control manufacturing system of claim 1, wherein the manufacturing information includes visual images of the product being fabricated.

5. The remote control manufacturing system of claim 1, wherein the remote computer system includes software for generating a deposition tool path file from the description of the product.

6. The remote control manufacturing system of claim 5, wherein the remote computer system includes software for minimizing the size of the deposition tool path file.

7. The remote control manufacturing system of claim 1, wherein a user interfaces to the communications link through an Internet browser.

8. A remote control manufacturing system, comprising:
a laser-aided direct material deposition (DMD) system for fabricating a three-dimensional product by depositing successive material layers on a substrate, the material deposition system comprising:
a plurality of sensors providing outputs;
a local computer receiving and processing the sensor outputs to generate fabrication progress information; and
a feedback controller interfaced to the local computer and a numerical controller, the feedback controller being operative to control the material deposition process; and
a remote computer system, comprising:
a computerized description of the product;
a software package for creating a file of a deposition tool path for the fabrication of the product; and
a communications system for sending the tool path file to and receiving the fabrication progress information from the local computer, so that the fabrication of the product can be monitored, controlled and modified from the remote computer system through the local computer in real time on line.

9. The remote control manufacturing system of claim 8, wherein one of the sensors is an acoustic sensor.

10. The remote control manufacturing system of claim 8, wherein one of the sensors is an optical sensor.

11. The remote control manufacturing system of claim 8, wherein the fabrication progress information includes product temperature, stress or strain.

12. The remote control manufacturing system of claim 8, wherein the fabrication progress information includes the height of the deposition layers.

13. The remote control manufacturing system of claim 8, wherein the deposition tool path file is compressed to reduce its size at the remote computer system.

14. The remote control manufacturing system of claim 8, further comprising a video or television camera recording the fabrication process and transmitting the images to be viewed on a screen display situated at the remote computer system.

15. The remote control manufacturing system of claim 8, wherein the communications system connecting the local and remote computers includes an Internet browser.

16. A method associated with the remote-control fabrication of a product, comprising the steps of:
a) generating a file of a deposition tool path at a remote computer, and sending the file to a local computer at the manufacturing site;
b) transferring the deposition tool path file to a numerical controller interfaced to a laser-aided, direct material deposition system to fabricate the product on a substrate by depositing successive layers having a height;
c) collecting in the local computer real-time strain and temperature sensor data of the product during material deposition;
d) sending the strain and temperature data to the remote computer via a communications system; and
e) sending control commands from the remote computer to the local computer to control the material deposition process.

17. The method of claim 16, further comprising the steps of:
inputting the strain data into a finite-element program in the local computer to calculate residual stress data for the product; and
sending the stress data to the remote computer via the communications system.

18. The method of claim 16, wherein the file of the deposition tool path is compressed to reduce its size.

19. The method of claim 16, wherein the direct material deposition system of step b) includes a feedback controller for controlling the height of each deposited layer.

20. The method of claim 16, comprising the additional step of using a video or television camera to record the fabrication of the product and sending the images to a display connected to the remote computer.

21. The method of claim 16, comprising the additional step of:
editing the file of the deposition tool path in the remote computer and sending the edited file to the local computer.

* * * * *